United States Patent [19]
Stockton

[11] Patent Number: 5,557,977
[45] Date of Patent: Sep. 24, 1996

[54] SYSTEM FOR POWERING ROTATING VEHICLE ACCESSORIES USING TRANSMISSION

[75] Inventor: Thomas R. Stockton, Ann Arbor, Mich.

[73] Assignee: Ford Motor Company, Dearborn, Mich.

[21] Appl. No.: 554,017

[22] Filed: Nov. 6, 1995

[51] Int. Cl.⁶ ................................................ F16H 47/08
[52] U.S. Cl. .............................. 74/15.84; 475/47; 475/51
[58] Field of Search .......................... 475/47, 49, 51; 74/15.4, 15.84

[56] References Cited

U.S. PATENT DOCUMENTS

| | | | |
|---|---|---|---|
| 3,004,438 | 10/1961 | Funk et al. | 74/15.84 |
| 3,023,639 | 3/1962 | Weinrich et al. | 475/49 |
| 3,040,589 | 6/1962 | Chapman | 74/15.84 |
| 4,256,135 | 5/1981 | Smirl | 137/375 |
| 4,296,717 | 10/1981 | Schlagmuller | 123/195 A |
| 4,706,520 | 11/1987 | Sivalingam | 475/140 |
| 4,846,768 | 7/1989 | Kitami et al. | 474/86 |
| 4,854,921 | 8/1989 | Kumm | 474/49 |
| 4,878,401 | 11/1989 | Chung | 475/153 |
| 4,969,857 | 11/1990 | Kumm | 474/49 |
| 5,170,674 | 12/1992 | Williams et al. | 74/15.4 |

*Primary Examiner*—Dirk Wright
*Attorney, Agent, or Firm*—Neil P. Ferraro

[57] ABSTRACT

A system for powering various rotating vehicle accessories such as an alternator, a transmission fluid pump, a power-steering pump, and an air-conditioning compressor from the torque converter of an automatic transmission. The system utilizes the smooth speed characteristic of the automatic transmission torque converter to achieve an equally smooth accessory drive ratio transition. The system may also be used to power the accessories using a manual transmission.

20 Claims, 5 Drawing Sheets 5,557,977

SYSTEM FOR POWERING ROTATING VEHICLE ACCESSORIES USING TRANSMISSION

FIELD OF THE INVENTION

The present invention relates to an accessory drive system powered by the transmission of a vehicle, and more particularly to, a system wherein the accessories are powered from the torque converter of an automatic transmission to achieve a smooth accessory drive speed transition. In an alternate embodiment, the accessories are driven by the clutch in a manual transmission.

BACKGROUND OF THE INVENTION

Internal combustion engines typically drive several accessories through a belt arrangement powered by the engine crankshaft. Such accessories generally include an air-conditioner compressor, power steering pump and alternator, for example. A well recognized problem with conventional belt driven systems is that the accessories' rate of rotation is proportional to engine speed. The design of such accessories has thereby been compromised in order to insure adequate performance at low engine speeds and dependability and longevity at high engine speeds. To solve this problem, as well as attain other benefits including increased fuel economy, and reduced weight, noise, and vibration, it has been proposed to operate the accessories at a changeable drive ratio instead of a fixed drive ratio whereby the accessories are driven relatively faster at low engine speeds (such as idle speed) and relatively slower at high engine speeds (such as cruising speed). These various speed changing devices are mounted to the front end of the engine crankshaft and have been developed in both a continuously variable speed ratio and a discrete shift between two ratios. However, none of these prior art devices have proven to be practical from the standpoint of smoothness, space limitation, cost, or durability.

With the relatively great combined rotational inertia of the typical accessory system with power steering pump, air-conditioning compressor, and alternator, a discrete shift between a 2:1 ratio span would be of objectionable smoothness. This indicates that such an accessory drive system should shift gradually and smoothly. The converter controlled accessory drive of the present invention utilizes the speed characteristics of the automatic transmission torque converter to achieve a completely smooth ratio transition, regardless of the accessory load. The present invention also relates to a clutch controlled accessory drive wherein the accessories are driven by the clutch in a manual transmission.

The closest known transmission driven accessory drive is a PTO (power take-off). A PTO is generally a gearbox, or mechanical device used to transmit power from an engine, through a transmission, to another mechanical or hydraulic device. There are several types of PTOs, including the well established transmission-mounted model, commonly called a side mount PTO. PTO's are normally used when the vehicle is stationary, and the transmission gear which drives the PTO provides power in the amounts desired. Engine power can be of concern if operation is at low RPM and the engine is of small displacement. However, conventional PTO's do not provide two speed ratios.

Accordingly, an advantage of the present invention is the reduction of weight, noise, and vibration while increasing performance and durability of automotive accessories, thereby improving fuel economy by providing a changeable speed accessory drive driven off the transmission of a vehicle.

Another advantage of the present invention is that an accessory drive system that shifts between two speeds smoothly by utilizing the speed characteristics of an automatic transmission torque converter is provided.

Yet another advantage of the present invention is that an accessory drive system which is simple and reliable in construction and operation is attained.

Other objects, features and advantages of the present invention will be readily appreciated by the reader of this specification.

SUMMARY OF THE INVENTION

According to the present invention, a system for powering rotating accessories of a vehicle includes an automatic transmission powered by an engine, with the transmission comprising a housing and a torque converter at least partially housed therein. The torque converter has an impeller driveably connected to the engine and a turbine that is driven by the impeller to drive an output shaft of the transmission which drives the vehicle. The system also has a converter lock-up clutch connected to the impeller and the turbine. To transmit power to as well as to change drive speeds of the accessories, a planetary gear set is used. The planetary gear set has a sun gear coupled to the output shaft, a plurality of pinions rotatably coupled to the sun gear, a carrier rotatably coupled to the pinions and a ring gear rotatably coupled to the pinions and the engine. Further, the accessories are rotatably coupled to the carrier of the planetary gear set. Thus, the accessories are operable between at least two speed ratios. To control the system, a controller may be provided which receives a plurality of sensed vehicle operating conditions and compares these conditions to predetermined values.

Also, according to the present invention, a system for powering rotating accessories of a vehicle includes a manual transmission powered by an engine, with the transmission comprising a housing and a clutch at least partially housed therein. The clutch engages a plurality of input drive gears. To transmit power to as well as to change drive speeds of the accessories, a planetary gear set is used. The planetary gear set has a sun gear coupled to an output shaft of the transmission by way of a one-way clutch, a plurality of pinions rotatably coupled to the sun gear, a carrier rotatably coupled to the pinions and a ring gear rotatably coupled to the pinions and the engine. Further, the accessories are rotatably coupled to the carrier of the planetary gear set. Thus, the accessories are operable between at least two speed ratios.

Also, according to the present invention, a method for powering rotating accessories of a vehicle includes the step of providing an automatic transmission powered by an engine, with the transmission comprising a housing and a torque converter at least partially housed therein. The torque converter has an impeller driveably connected to the engine and a turbine that is driven by the impeller to drive an output shaft of the transmission which drives the vehicle. The method also includes the step of providing a converter lock-up clutch connected to the impeller and the turbine. To transmit power to as well as to change drive speeds of the accessories, the method also includes the steps of rotatably coupling the accessories to the output shaft of the transmission such that the accessories shifts smoothly between at least two speeds. Further, to control the accessories, the method includes the steps of receiving a plurality of sensed vehicle operating conditions and comparing these sensed vehicle operating conditions to predetermined values.

BRIEF DESCRIPTION OF THE DRAWINGS

The invention will now be described, by way of example, with reference to the accompany drawings, in which.

DETAILED DESCRIPTION OF THE PREFERRED EMBODIMENTS

Figure 1:
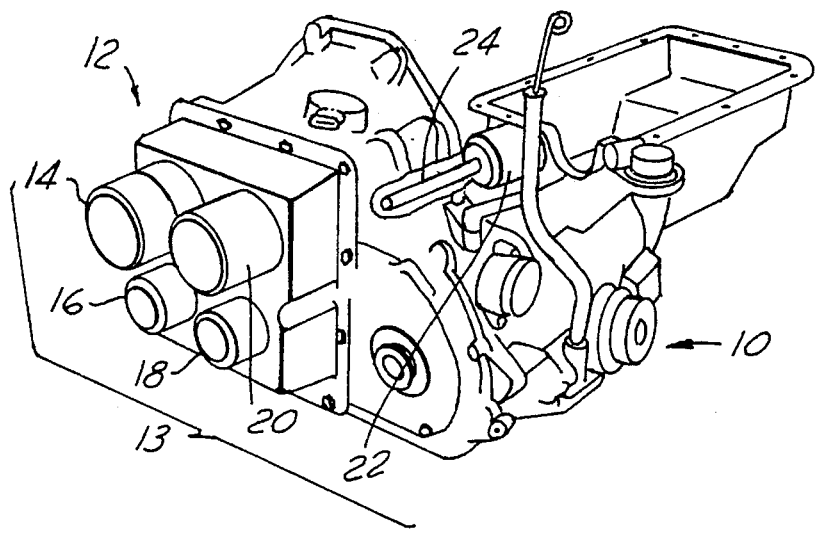
FIG. 1 is a perspective view of a front wheel drive U-drive transmission incorporating the system of the present invention.

FIG. 1 shows front wheel drive U-drive automatic transmission 10 having converter controlled accessory drive system (CCAD) 12 used to drive accessories 13 according to the present invention. Transmission 10 also has related components well known to those skilled in the art. Accessories 13 typically include air-conditioner compressor 14, power steering pump 16, transmission fluid pump 18, and alternator 20. In addition, engine oil pump 22 may be driven by a quill shaft 24.

Figure 2:
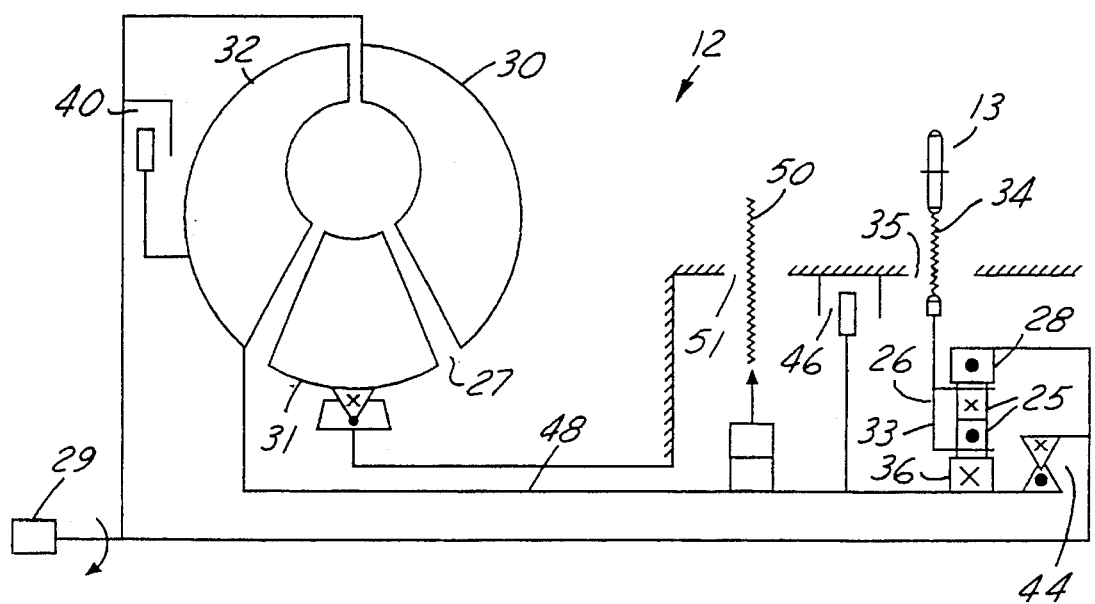
FIG. 2 is a schematic illustration of the system for powering vehicle accessories using the front wheel drive U-drive transmission according to the present invention.
Figure 3:
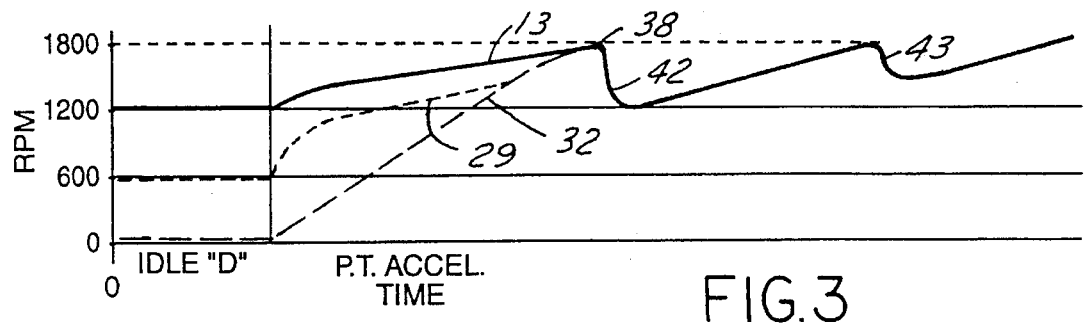
FIG. 3 is a diagram showing RPM of the engine, accessories and drive shaft versus powertrain acceleration of the vehicle incorporating the system of FIG. 2.

FIG. 2 is a schematic diagram of CCAD 12 for front wheel drive U-drive automatic transmission 10 according to the present invention. Double pinion planetary gear set 26 is used so as to provide a ratio span of 2:1. It should be noted that gear set 26 is a separate gear set from the many planetary gear sets typically found in an automatic transmission. Gear set 26 comprises a ring gear 28, sun gear 36 and pinions 25, which are mounted to carrier 33 and located between ring gear 28 and sun gear 36. Ring gear 28 is directly driven by engine 29 through impeller 30 of torque converter 27. In addition to impeller 30, a typical torque converter 27 has stator 31 connected to ground (transmission case) and turbine 32. The operation of torque converter 27 will not be described as this is well known in the art. Carrier 33, in turn, drives accessories 13, by, for example, belts, chains or gears. In the example described herein, accessories 13 are driven by chain 34 through transmission case opening 35; however, it is preferable that accessories 13 be driven by a gear. Sun gear 36 is connected to converter turbine 32 and connects the reaction torque of gear set 26 in "drive" range to the transmission input. Sun gear 36 is stationary at vehicle start-up, causing carrier 33, and thus accessories 13, to overdrive at typically 2:1. That is, when the vehicle is in idle "drive", accessories 13 are driven by engine 29 (because ring gear 28 is directly driven by engine 29 through impeller 30) at twice engine speed (2:1). As seen in FIG. 3, as turbine 32 speed increases linearly with vehicle speed, in any given transmission gear ratio, sun gear 36 speed increases accordingly until converter coupling point 37 is reached or converter lock-up clutch 40 is applied. Gear set 26 and accessories 13 now reach synchronous speed with the engine for a 1:1 ratio and continue this 1:1 ratio through second 42 and third 43 up-shifts.

Figure 10:
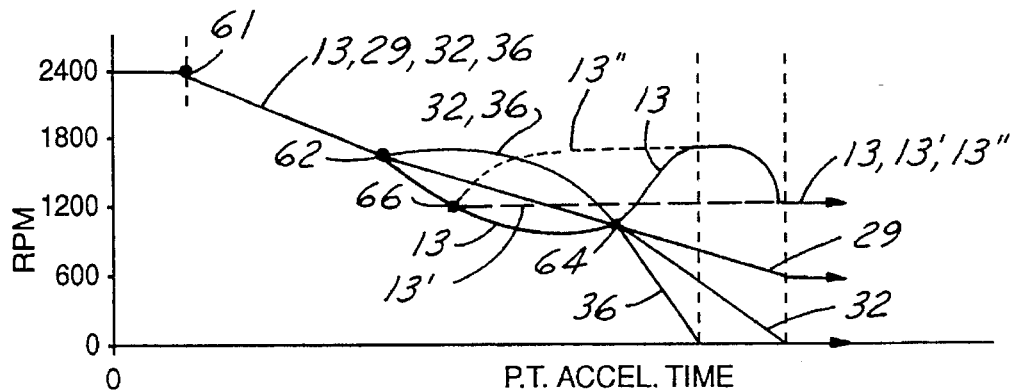
FIG. 10 is a diagram showing RPM of the engine, accessories and drive shaft versus powertrain acceleration during vehicle coast down of the vehicle incorporating the system of the present invention.

One-way clutch 44 is placed between ring gear 28 and sun gear 36 such that these gears lock-up gear set 26 in "neutral" and "park" range and cause accessories 13 to be driven at 1:1. In this condition, turbine 32 is unloaded. The 2:1 ratio could be obtained, if desired, by applying clutch brake 46 to ground. Clutch brake 46 could also be applied in the event that a heavy accessory load causes undesirable creep in idle "drive". Clutch brake 46 application would only be under the condition of closed engine throttle and near zero engine idle speed in "drive" range. Another benefit of one-way clutch 44 is to eliminate accessory drive shock during transmission up-shifts. During up-shifts, the abrupt drop of speed of engine 29 normally forces a torque reversal in conventional accessory belt drive systems, because of the heavy rotational inertia. In CCAD 12 of the present invention, one-way clutch 44 overruns until accessories 13 coast down to a synchronous speed, avoiding a shock load. The deceleration rate depends on both the inertia and accessory loading but remains smooth. (See description with reference to FIG. 10). For the sake of completeness, as is well known in the art, power to the vehicle wheels is transferred from turbine shaft 48 to the wheels (not shown) by, for example, chain 50 through transmission case opening 51.

Figure 4:
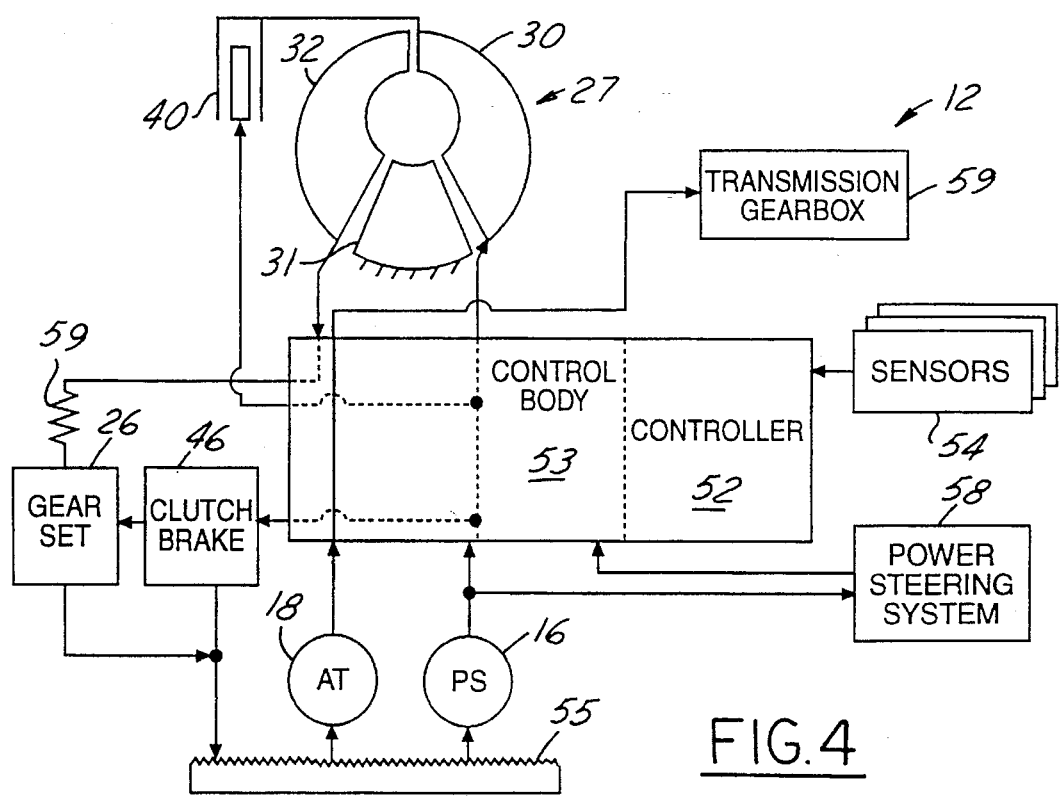
FIG. 4 is a schematic block diagram of a control system according to the present invention.

Referring to FIG. 4, a control system for CCAD 12 is shown. Controller 52, which may comprise an electronic engine operating controller drawn from many of the types known to those skilled in the art of automotive electronic engine controllers, receives a variety of inputs from engine operating sensors 54 which include many of the types of sensors known to those skilled in the art of engine control and suggested by this disclosure. Accordingly, sensors 54 may include engine speed, engine load, intake manifold absolute pressure, engine intake air mass flow rate, engine temperature, vehicle speed, vehicle gear selection, throttle position, accelerator position, and other parameters known to those skilled in the art and suggested by this disclosure. Controller 52 then compares the sensed operating parameters with predetermined threshold values. For example, in a typical control algorithm, converter lock-up clutch 40 would not be engaged until the speed of engine 29 approaches the speed of turbine 32 (at coupling point 38). Then, the speed of accessories 13 and the speed of engine 29 would be at a 1:1 ratio that is equal to the speed of turbine 32. Controller 52 may further control clutch brake 46 which acts on gear set 26. Controller 52 communicates with, for example, lock-up clutch 40 and clutch brake 46 through control body 53. Further, as shown in FIG. 4, in order to cool the fluid exiting turbine 32 which is used to lubricate gear set 26, a fluid cooler 59 is used.

In a preferred control arrangement, because the power steering hydraulic fluid and transmission hydraulic fluid are generally the same type of fluid, power steering pump 16 may pump fluid from reservoir 55 to supply CCAD 12 with the necessary fluid. In addition, this fluid may be used to cool torque converter 27. Because power steering pump 16 is over-sized so as to provide the required flow rate for power steering system 58 when an abrupt turn is made, there is normally an excess amount of fluid available returning to reservoir 55. In this embodiment, however, that excess fluid is routed to control body 53 for use by CCAD 12. By utilizing this excess capacity of power steering pump 16, automatic transmission pump 18 may be down sized to about 40% of its original capacity. In addition, with the 2:1 drive ratio, the capacity of automatic transmission pump 18 may be further cut in half, resulting in a pump about of its original size. That is, transmission pump 18 may be driven at a faster rate than in conventional systems, thereby maintaining a desired fluid flow rate with a smaller pump. Because the size of automatic transmission pump 18 and power steering pump 16 is directly tied to fuel consumption, the reduction in pump size increases fuel economy. Automatic transmission pump 18 now merely supplies lubricating fluid to the transmission's gearbox 59, because power steering pump 16 now supplies fluid to torque converter 27, lock-up clutch 40 and clutch brake 46.

Figure 5:
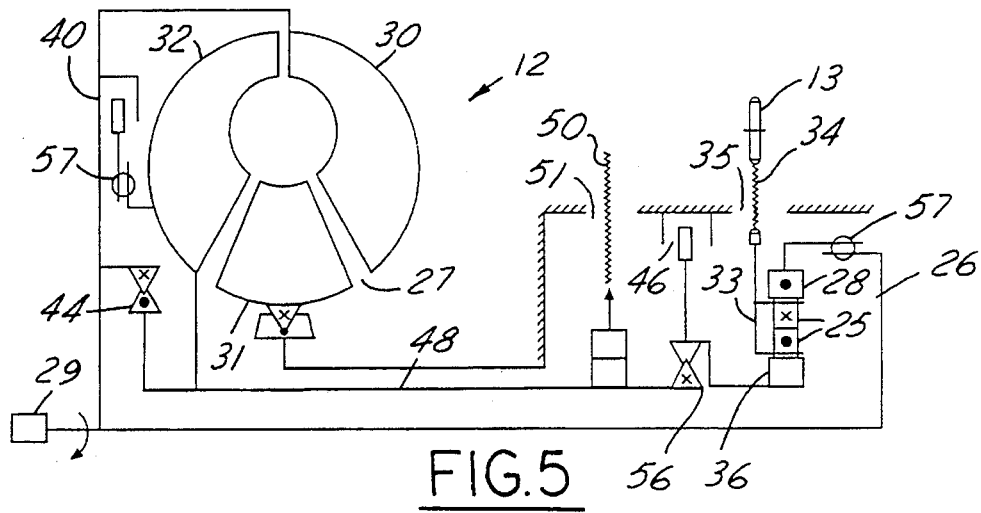
FIG. 5 is a schematic illustration of a second embodiment of the present invention for a front wheel drive transmission.

FIG. 5 shows a second embodiment of the present invention for a front wheel drive transmission. One-way clutch 56 has been added between sun gear 36 and turbine shaft 48. This gives the added benefit of the 2:1 accessory speed-up in the transmission "neutral" position. Note that in this Figure, one-way clutch 44 is shown on the left side of the illustration. Nevertheless, one-way clutch 44 is still physically located between ring gear 28 and sun gear 36. Further, as will be apparent to one of ordinary skill in the art in view of this disclosure, dampers 57 may be provided as shown.

Figure 6:
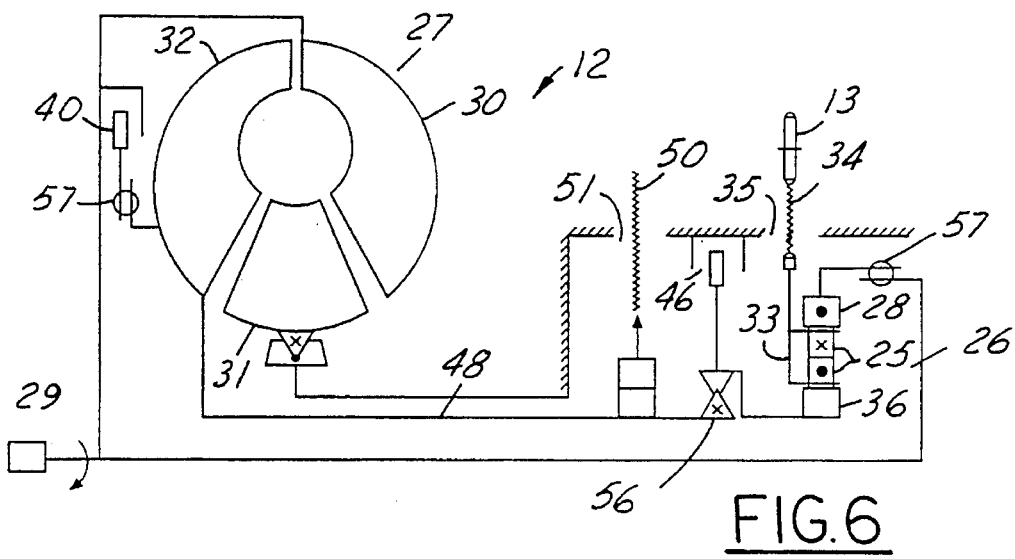
FIG. 6 is a schematic illustration of a third embodiment of the present invention for a front wheel drive transmission.

FIG. 6 shows a third embodiment of the present invention for a front wheel drive transmission. Here, as a means to eliminate one-way clutch 44 between sun gear 36 and turbine shaft 48, while retaining the 2:1 accessory overdrive in the transmission "neutral" position, converter lock-up clutch 40 is spring loaded "on" during engine start. The spring load on converter lock-up clutch 40 is only of sufficient capacity to drive transmission fluid pump 18 for hydraulically engaging clutch brake 46. The speed of accessories 13 would immediately rise to the 2:1 overdrive ratio. Converter lock-up clutch 40 would then be hydraulically released in "neutral" as well as in any other desired condition, including vehicle coasting or engine braking.

Because of the mechanical torque feedback to sun gear 36 tending to assist driving turbine 32, turbine 32 is partially unloaded, depending on the load of accessories 13. This tends to raise slightly the apparent coupling point 38, and so converter lock-up clutch 40 can now be applied at a slightly higher speed ratio than normal. With a smaller speed differential existing between impeller 30 and turbine 32 at the clutch shift point, the shift would feel smoother.

Figure 7:
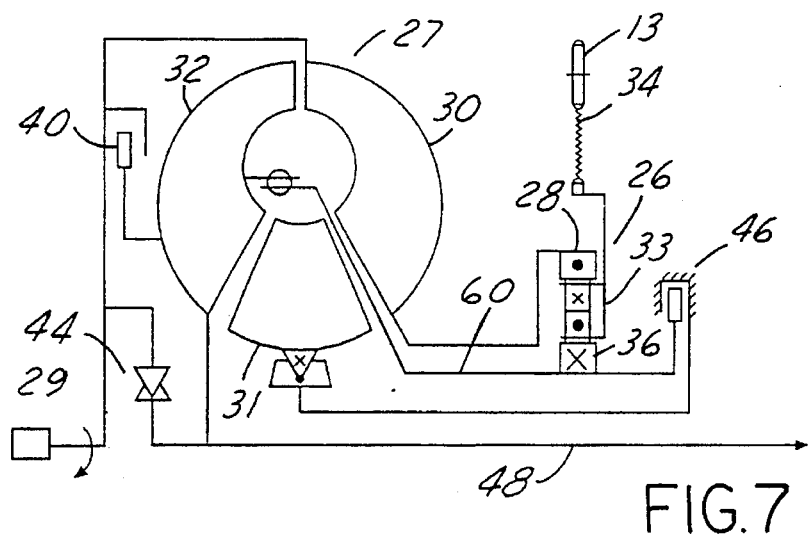
FIG. 7 is a schematic illustration of a system for powering vehicle accessories using a rear wheel drive transmission according to the present invention.

CCAD 12 has application to both front wheel drive and rear wheel drive vehicles with an automatic transmission. In rear wheel drive applications, as shown in FIG. 7, a spoked member 60 connecting turbine 32 and ring gear 28 must pass through the converter flow path between impeller 30 and stator 31. Spoked member 60 only carries the drive torque of accessories 13 and would be of light construction. This configuration could also be employed for the front wheel drive U-drive automatic transmission; but, the simpler arrangement as shown in FIG. 2 is preferred. Otherwise, the operation of CCAD 12 for rear wheel vehicles is similar to that of front wheel drive vehicles as described with reference to FIGS. 2 and 3.

Figure 8:
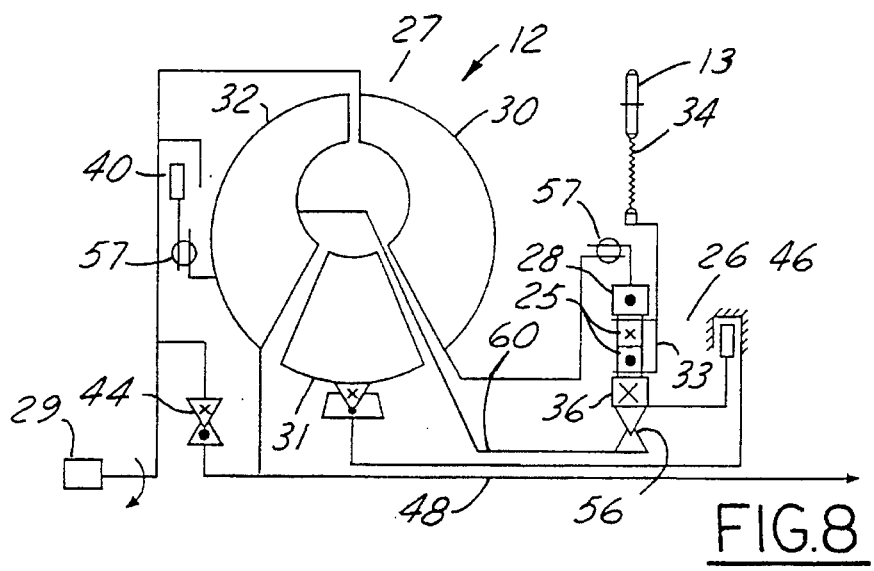
FIG. 8 is a schematic illustration of a second embodiment of the present invention for a rear wheel drive transmission.

FIG. 8 shows a second embodiment of the present invention for a rear wheel drive vehicle. Here, as in the embodiment described with reference to FIG. 5, one-way clutch 56 has been added between sun gear 36 and turbine shaft 48. This gives the added benefit of the 2:1 accessory speed-up in the transmission "neutral" position.

Figure 9:
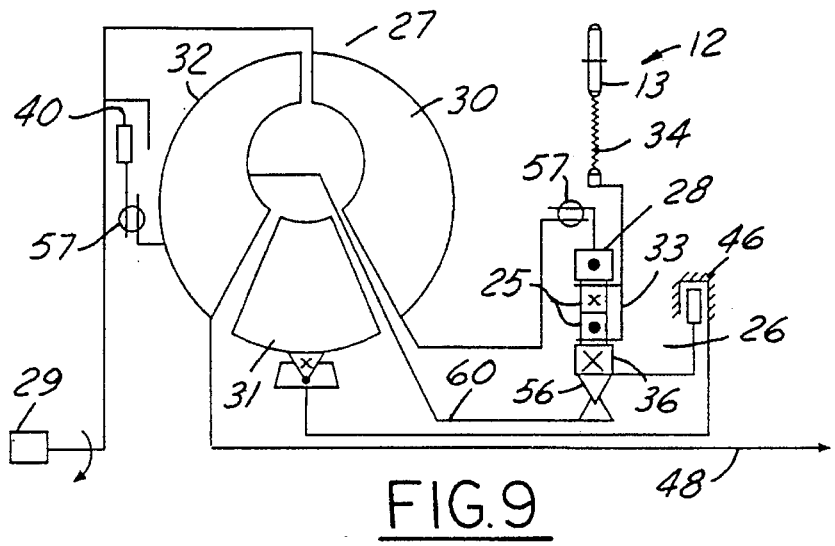
FIG. 9 is a schematic illustration of a third embodiment of the present invention for a rear wheel drive transmission.

FIG. 9 shows a third embodiment of the present invention for a rear wheel drive vehicle. Here, as in the embodiment described with reference to FIG. 6, one-way clutch 44 between sun gear 36 and turbine shaft 48 may be eliminated. To accomplish this, while retaining the 2:1 accessory overdrive in the transmission "neutral" position, converter lock-up clutch 40 is spring loaded "on" during engine start. The spring load on converter lock-up clutch 40 is only of sufficient capacity to drive transmission fluid pump 18 for hydraulically engaging clutch brake 46. The speed of accessories 13 would immediately rise to the 2:1 overdrive ratio. Converter lock-up clutch 40 would then be hydraulically released and "neutral" as well as in any other desired condition, including vehicle coasting or engine braking.

For controlling the drive speed of accessories 13 during vehicle coast down, converter lock-up clutch 40 continues to be applied at coast-down at closed throttle (point 61) but before engine idle RPM. (See FIG. 10). Before lock-up clutch 40 is released, via instruction from controller 52, the drive speed of accessories 13 equals the speed of engine 29. At point 62 when lock-up clutch 40 is released, vehicle coast torque and the feed-back torque of accessories 13 combine, causing turbine 32 to over-speed the speed of engine 29 and thus the speed of accessories 13 falls but remains above twice engine idle speed (600 RPM). As coasting continues, the speed of engine 29, turbine 32 and sun gear 36 also fall and reach equal speed when clutch brake 46 is applied (point 64). Now, the drive speed of accessories 13 equals the speed of engine 29 somewhere between the desired 1200 RPM and 600 RPM idle, namely, for example, 1000 RPM. The speed of accessories 13 then rises to about 1600 RPM once clutch brake 46 is fully engaged before dropping back to 1200 RPM to remain constant thereafter.

If the momentary loss of power in accessories 13 (less than 1200 RPM) is undesirable, with converter lock-up clutch 40 off and where the speed of accessories 13 reaches 1200 RPM at point 66, a constant 1200 RPM for accessories 13 (shown as 13') may be maintained until the vehicle reaches its rest position. This is shown as a dashed line in FIG. 10 and is accomplished by controller 52 sensing the speed of accessories 13 and causing clutch brake 46 to be applied so as to maintain constant speed of accessories 13. Further, a more abrupt clutch brake 46 application at an accessory speed of 1200 (shown at point 66) may be utilized. In this case, the speed of accessories 13 (shown as 13") would rise an estimated 33% to 1600 RPM and then fall to 1200 RPM at vehicle rest. This is shown as a dotted line in FIG. 10.

Figure 11:
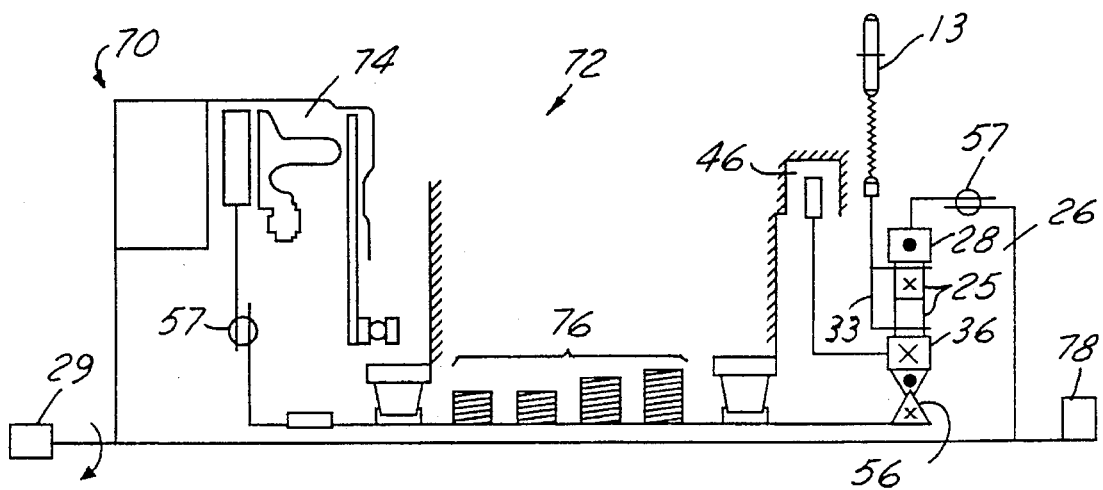
FIG. 11 is a schematic diagram of a system for powering accessories of a vehicle using a front wheel drive manual transmission according to the present invention; and, FIG. 12 is a diagram showing RPM of the engine, accessories and drive shaft versus powertrain acceleration of the vehicle incorporating the system of FIG. 11.
Figure 12:
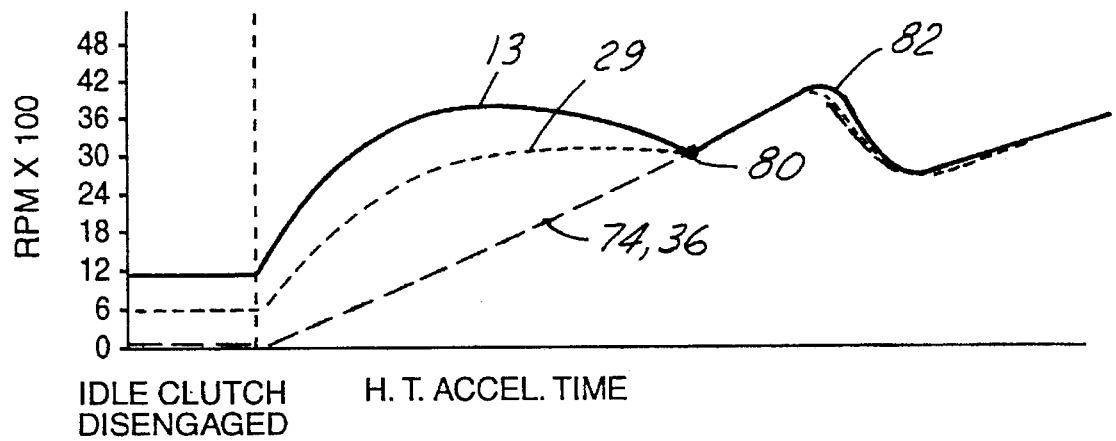

Turning now to FIGS. 11 and 12, manual transmission 70 for a front wheel drive vehicle embodying clutch control accessory drive system 72 of the present invention is shown. Manual transmission 70 further comprises clutch 74, gears 76 and one-way clutch 56. Clutch control accessory drive system 72 comprises planetary gear set 26 having ring gear 28, carrier 33 and sun gear 36, and clutch brake 46. In this case, the speed of manual transmission clutch 74 controls the speed of accessories 13 instead of the automatic transmission torque converter 27 of FIGS. 1–10, resulting in a different speed characteristic as shown in FIG. 12. A small displacement fluid pump 78 provides transmission fluid for application of clutch 74 and also permits pressure and/or spray lubrication to the gear box. This eliminates the usual fluid turning drag losses from submerged gears and is beneficial for improved life and fuel economy. The speed curve shown in FIG. 12 is similar to that shown in FIG. 3. Sun gear 36 is stationary at vehicle start-up, causing carrier 33, and thus accessories 13, to overdrive at typically 2:1. That is, when the vehicle is in idle "drive", accessories 13 are driven by engine 29 (because ring gear 28 is directly driven by engine 29 through impeller 30) at twice engine speed (2:1). As seen in FIG. 12, as the speed of clutch 74 increases linearly with vehicle speed, the speed of sun gear 34 increases accordingly until clutch 74 is engaged at point 80. Double pinion planetary gear set 26 and accessories 13 now reach synchronous speed with engine 29 for a 1:1 ratio and continue this 1:1 ratio through second 82 up-shift.

While the best mode in carrying out present invention has been described in detail, those familiar with the art to which this invention relates will recognize various alternative designs and embodiments, including those mentioned above, in practicing the invention as defined by the following claims.

I claim:

1. A system for powering rotating accessories of a vehicle, the system comprising:
    an automatic transmission powered by an engine, said transmission comprising: a housing, and a torque converter at least partially housed in said housing, said torque converter having an impeller driveably connected to said engine and a turbine being driven by said impeller and driving an output shaft of said transmission to drive said vehicle;
    a converter lock-up clutch connected to said impeller and said turbine;
    a planetary gear set comprising a sun gear coupled to said output shaft, a plurality of pinions rotatably coupled to said sun gear, a carrier rotatably coupled to said pinions and a ring gear rotatably coupled to said pinions and said engine; and,
    wherein said accessories are rotatably coupled to said carrier of said planetary gear set such that said accessories are operable between at least two speed ratios.

2. A system according to claim 1 further comprising a controller means for receiving a plurality of sensed vehicle operating conditions, for comparing said sensed vehicle operating conditions to predetermined values, and for controlling the speed of said accessories, and wherein said transmission is a front wheel drive transmission.

3. A system according to claim 2 wherein a one-way clutch is positioned between said ring gear and said sun gear such that said planetary gear set locks up when said transmission is not engaged with said output shaft.

4. A system according to claim 2 further comprising a clutch brake positioned between said output shaft and said transmission housing.

5. A system according to claim 2 further comprising a second one-way clutch positioned between said sun gear and said output shaft.

6. A system according to claim 2 wherein said converter lock-up clutch is spring loaded in an applied position while said engine is being started.

7. A system according to claim 1 further comprising a controller means for receiving a plurality of sensed vehicle operating conditions, for comparing said sensed vehicle operating conditions to predetermined values, and for controlling the speed of said accessories, and wherein said transmission is a rear wheel drive transmission comprising a spoked member connecting said turbine to said ring gear.

8. A system according to claim 7 wherein a one-way clutch is positioned between said ring gear and said sun gear such that said planetary gear set locks up when said transmission is not engaged with said output shaft.

9. A system according to claim 7 further comprising a clutch brake positioned between said output shaft and said transmission housing.

10. A system according to claim 7 further comprising a second one-way clutch positioned between said sun gear and said output shaft.

11. A system according to claim 7 wherein said converter lock-up clutch is spring loaded in an applied position while said engine is being started.

12. A system according to claim 1 wherein said controller means senses a vehicle coast-down condition and signals a clutch brake positioned between said output shaft and said transmission housing to be released when said engine is at closed throttle but before engine idle RPM is reached.

13. A system according to claim 12 wherein said controller means signals said lock-up clutch to release.

14. A system according to claim 1 further comprising a power steering pump having excess capacity for supplying hydraulic fluid to both said system and to a power steering system.

15. A system according to claim 14 further comprising a transmission fluid pump being smaller than a standard transmission fluid pump while maintaining adequate fluid flow.

16. A system for powering rotating accessories of a vehicle, the system comprising:
    a manual transmission powered by an engine, said transmission comprising a housing and a clutch at least partially housed within said housing for engaging a plurality of input drive gears;
    a planetary gear set comprising a sun gear coupled to an output shaft of said transmission by way of a one-way clutch, a plurality of pinions rotatably coupled to said sun gear, a carrier rotatably coupled to said pinions and a ring gear rotatably coupled to said pinions and said engine; and,
    wherein said accessories are rotatably coupled to said carrier of said planetary gear set such that said accessories are operation between at least two speed ratios.

17. A method of powering rotating accessories of a vehicle comprising the steps of:
    providing an automatic transmission powered by an engine, said transmission comprising a housing, a torque converter at least partially housed in said housing, said torque converter having an impeller driveably connected to said engine and a turbine being driven by said impeller and driving an output shaft of said transmission to drive said vehicle;
    providing a converter lock-up clutch connected to said impeller and said turbine;
    rotatably coupling said accessories to said output shaft of said transmission such that said accessories smoothly operate between at least two speeds; and, controlling the speed of said accessory drive.

18. A method according to claim 17 wherein said rotatably coupling said accessories such that said accessories smoothly operate between at least two speeds step comprises the step of rotatably attaching a sun gear of a planetary gear set to said output shaft and rotatably attaching said accessories to a carrier of said planetary gear set.

19. A method according to claim 17 wherein said controlling step comprises the steps of: receiving a plurality of sensed vehicle operating conditions; comparing said sensed vehicle operating conditions to predetermined values; and, engaging said lock-up clutch when engine speed and turbine speed approach each other.

20. A method according to claim 19 further comprising the step of providing a clutch brake between said output shaft and said housing and wherein said controlling step further comprises the step of applying said clutch brake.

* * * * *